(12) United States Patent
Wiedemann et al.

(10) Patent No.: US 10,767,011 B2
(45) Date of Patent: Sep. 8, 2020

(54) TRANSPARENT POLYAMIDE MOULDING COMPOSITIONS WITH HIGH TENSILE STRAIN AT BREAK

(71) Applicant: EMS-PATENT AG, Domat/Ems (CH)

(72) Inventors: Thomas Wiedemann, Domat/Ems (CH); Manfred Hewel, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 3 days.

(21) Appl. No.: 15/842,959

(22) Filed: Dec. 15, 2017

(65) Prior Publication Data

US 2018/0171074 A1 Jun. 21, 2018

(30) Foreign Application Priority Data

Dec. 16, 2016 (EP) ..................... 16204566

(51) Int. Cl.
 *C08G 69/26* (2006.01)
 *C08G 69/28* (2006.01)
 *B29B 9/06* (2006.01)
 *B29K 77/00* (2006.01)

(52) U.S. Cl.
 CPC ........... *C08G 69/265* (2013.01); *C08G 69/28* (2013.01); *B29B 9/06* (2013.01); *B29K 2077/00* (2013.01); *B29K 2995/0026* (2013.01)

(58) Field of Classification Search
 CPC ........ C08G 69/265; C08G 69/28; B29B 9/06; B29K 2077/00; B29K 2995/0026
 See application file for complete search history.

(56) References Cited

U.S. PATENT DOCUMENTS 4,207,411 A * 6/1980 Shue .................... C08G 69/265
528/310

FOREIGN PATENT DOCUMENTS

| EP | 0 041 130 A2 | 12/1981 |
|---|---|---|
| EP | 0 885 930 A1 | 12/1998 |
| EP | 1 826 229 A1 | 8/2007 |
| EP | 1 930 373 A2 | 6/2008 |
| WO | 2007/087896 A1 | 8/2007 |

OTHER PUBLICATIONS

European Search Report for 16204566.0, dated Jun. 2, 2017.

* cited by examiner

*Primary Examiner* — Shane Fang
(74) *Attorney, Agent, or Firm* — Sughrue Mion, PLLC

(57) ABSTRACT

A polyamide moulding composition with particularly good tensile strain at break consisting of the following constituents: (A) 50 to 100% by weight of at least one transparent polyamide composed of: (a1) 55 to 77 mol % of acyclic, aliphatic diamine having 5-10 carbon atoms; (a2) 23 to 45 mol % of cycloaliphatic diamine having 6-36 C atoms, where the proportions of (a1) and (a2) are based on the entirety of the diamines used; (a3) 40 to 80 mol % of aromatic dicarboxylic acid or a mixture of such dicarboxylic acids; and (a4) 20 to 60 mol % of acyclic, aliphatic dicarboxylic acid having 8 to 16 carbon atoms, or a mixture of such dicarboxylic acids, where the proportions of (a3) and (a4) are based on the entirety of the dicarboxylic acids used; and (B) 0-50% by weight of additives; where the entirety of components (A) and (B) gives 100% by weight.

25 Claims, No Drawings

TRANSPARENT POLYAMIDE MOULDING COMPOSITIONS WITH HIGH TENSILE STRAIN AT BREAK

TECHNICAL FIELD

The present invention relates to transparent polyamide moulding compositions of the type that can be used by way of example as housing constituents, in the household sector, the spoils equipment sector or the toy sector, and having particular mechanical properties.

PRIOR ART

Transparent thermoplastic materials are used in many fields, in particular in the housings sector, optical equipment sector and display sector, and also in the household devices sector, sports equipment sector and game-equipment sector. It is important here that the moulding compositions have good processing properties in order to provide a very wide variety of shaping possibilities, and it is also important that transparency is retained over a prolonged period of use, sometimes also after intensive insolation or exposure to chemicals. Mechanical properties, inter alia fracture behaviour, are likewise important. EP-A-0 885 930 describes a possibility for improving the impact resistance of transparent polyamides based on cycloaliphatic diamines with Tg>160° C. by admixing, with these rather brittle transparent polyamides, tougher polyamides of the 6T/12 or 6T/6I/12 type (blend). Although in some cases here impact resistance is improved without any excessive reduction of the stiffness of the transparent polyamide, there is no, or only insignificant, concomitant improvement in tensile strain at break. If aliphatic polyamides or olefinic impact modifiers are added to the blend, tensile modulus of elasticity is drastically reduced, but tensile strain at break still remains significantly below 100%.

EP-A-1 930 373 relates to transparent mouldings made of polyamide moulding compositions which exhibit little tendency towards formation of mechanical stress cracks under dynamic load. The polyamides used here are formed from at least one diamine selected from the group of hexamethylenediamine, bis(4-amino-3-methylcyclohexyl)methane and/or bis(4-aminocyclohexyl)methane and from at least one dicarboxylic acid selected from the group of isophthalic acid (IPA), terephthalic acid (TPA) and/or dodecanedioic acid (DDA), or from the abovementioned diamines and dicarboxylic acids in combination with lactams and/or α,ω-amino acids. Although the preferred variants, based either on 100% of the diamine 1,6-hexanediamine or on a mixture of 1,6-hexanediamine, MACM and PACM, are products with adequate stiffness due to their high tensile modulus of elasticity, tensile strain at break is too low for many applications.

WO-A-2007/087896 describes transparent polyamides which can be used for the production of superheated-steam-sterilizable transparent mouldings and extrudates, and of superheated-steam-sterilizable and transparent standard test specimens (ISO test specimens) of the same composition, where the standard test specimens withstand at least 100 superheated-steam-sterilization cycles (134° C./7 minutes) without reduction of tensile strain at break to less than yield strain and without occurrence of visible damage or deformation. These polyamides are in essence based on the diamines MACM and PACM and on the dicarboxylic acids IPA and TPA, and on lactam-12 as essential component, and they have high stiffness but low tensile strain at break.

U.S. Pat. No. 4,207,411 relates to amorphous transparent polyamides based exclusively on aromatic dicarboxylic acids and on at least two different diamines, a long-chain aliphatic diamine and a cycloaliphatic diamine. The compositions of the invention comprising in essence the long-chain diamine 5-methyl-1,9-nonanediamine are compared with comparative examples using the short-chain diamine 1,6-hexanediamine. The result found is that the compositions with long-chain diamine are markedly more ductile; tensile strain at break is higher by a factor of 2-3 than that of the polyamides comprising 1,6-hexanediamine.

EP-A-1 826 229 describes amorphous transparent polaymides based on PACM and terephthalic acid, where the proportion of cycloaliphatic diamine units is always at least 50 mol % within the diamine fraction.

EP-A-0 041 130 describes transparent thermoplastic polyamides based on cycloaliphatic diamine units and on aromatic dicarboxylic acid units.

DESCRIPTION OF THE INVENTION

Accordingly, it is an object of the present invention to provide transparent polyimide moulding compositions which have good processing properties and good mechanical properties and which in particular, with high transparency and low haze, provide the combination of high tensile modulus of elasticity with high tensile strain at break. The intention is to provide improved thermoplastic transparent polyamide moulding compositions in particular in respect of the ball impact test.

The concepts of transparency and haze should be interpreted as follows for the purposes of the present invention: The transparency of a plaque of thickness 2 mm produced from the transparent moulding composition, measured as light transmittance in accordance with ASTM D1003, is more than 85%, preferably more than 88%, with particular preference at least 90%, and haze is at most 5%, preferably at most 3%, with particular preference at most 2%. Values achieved for the desired use of the moulding compositions of the invention are stiffness values (tensile modulus of elasticity greater than 1800 MPa, preferably greater than 2000 MPa) and high toughness values (preferably impact resistance at 23° C.: no fracture). Good ultimate tensile strength and high tensile strain at break are moreover achieved, the latter preferably being in the region of 100%. Mouldings made of the moulding compositions of the invention moreover exhibit ductile fracture. No fractures occur in the ball impact test. A first aspect of the present invention accordingly relates to a polyamide moulding composition consisting of the following constituents:

(A) 50 to 100% by weight of at least one transparent polyamide composed of:
  (a1) 55 to 77 mol % of acyclic, aliphatic diamine having 5 to 10 carbon atoms;
  (a2) 23 to 45 mol % of cycloaliphatic diamine having 6 to 36 C atoms where the proportions of (a1) and (a2) are based on the entirety of the diamines used and give a total of 100 mol %;
  (a3) 40 to 80 mol % of aromatic dicarboxylic acid or a mixture of such dicarboxylic acids;
  (a4) 20 to 60 mol % of acyclic, aliphatic dicarboxylic acid having 8 to 16 carbon atoms, or of a mixture of such dicarboxylic acids;
  where the proportions of (a3) and (a4) are based on the entirety of the dicarboxylic acids used and give a total of 100 mol %;

(B) 0-50% by weight of additives;
where the entirety of components (A) and (B) gives 100% by weight.

Unexpectedly, it is found that this particular property combination is specifically provided by the simultaneous presence of all four units (a1)-(a4), i.e. in the case of the diamines both an aliphatic diamine and a cycloaliphatic diamine, and in the case of the dicarboxylic acids both at least one aromatic dicarboxylic acid and an aliphatic dicarboxylic acid having a comparatively long chain length. However, this is true only if the individual units are also used in the proportions according to the claims, and in the form of copolymer rather than in the form of a mixture of various polyamides. The actual specific effect that is unexpectedly achieved by this specific combination is the presence of particularly good mechanical properties, in particular high tensile modulus of elasticity, with very high tensile strain at break and with excellent optical properties (transparency, haze). It is moreover unexpectedly found that no fracture occurs in the ball impact test and accordingly no fragments are broken away from the plaque.

The particular feature of these transparent polyamides is therefore that they could unexpectedly combine the two properties of high stiffness and high ductility. The high stiffness here is equated to a tensile modulus of elasticity of at least 2000 MPa, preferably 2100 MPa, and the ductility is defined by a tensile strain at break of at least 100%, preferably at least 120%. Both properties are determined in accordance with ISO 527 (ISO 527-1:2012 and 527-2:2012). At the same time, these polyamides comply with stringent requirements in respect of transparency (>90%) and haze (<3%), in each case determined in accordance with ASTM D1003 on discs measuring 70×2 mm or plaques measuring 60×60×2 mm. The moulding compositions of the invention also exhibit little yellowing, and specifically not only directly after production but also after storage at elevated temperature, and unexpectedly exhibit little tendency towards fracture when exposed to stress in the manner of an impact, for example in the ball impact test.

The polyamides of the invention are based on a combination of at least two diamines with at least two dicarboxylic acids, and are free from lactams and/or from the corresponding aminocarboxylic acids.

According to a first preferred embodiment, such a polyimide moulding composition is characterized in that the starting material (a1) is a linear or branched diamine having 6-10 carbon atoms.

It is preferable that the starting material (a1) is a linear diamine having 6-8 carbon atoms.

With particular preference, (a1) is exclusively formed from 1,6-hexamethylenediamine and/or 2-methyl-1,5-pentanediamine.

According to another preferred embodiment, the starting material (a2), which is also a diamine, like (a1), but is otherwise structurally different from (a1), is a cycloaliphatic diamine having 6-20 carbon atoms. In particular, this is preferably selected from the group consisting of: bis(4-amino-3-methylcyclohexyl)methane (MACM), bis(4-aminocyclohexyl)methane (PACM), 2,2-bis(4-aminocyclohexyl)propane, 2,2-bis(4-amino-3-methylcyclohexyl)propane, bis(4-amino-3-ethylcyclohexyl)methane (EACM), bis(4-amino-3,5-dimethylcyclohexyl)methane (TMACM), isophoronediamine trimethylcyclohexanemethanamine), 1,3-diaminocyclohexane, 1,3-diaminomethyl-cyclohexane, 2,5-bis(aminomethyl)norbornane, 2,6-bis(aminomethyl) norbornane, 2,5-diaminonorbornane, 2,6-diaminonorbornane, or mixtures thereof. Particular preference is given to cycloaliphatic diamines having 12-20 carbon atoms, preferably selected from the group consisting of: bis(4-amino-3-methylcyclohexyl)methane (MACH), 2,2-bis(4-amino-3-methylcyclohexyl)propane (MACP), bis(4-aminocyclohexyl)methane (PACM), 2,2-bis(4-aminocyclohexyl)propane (PACP), bis(4-amino-3-ethylcyclohexyl)methane (EACM), 2,2-bis(4-amino-3-ethylcyclohexyl)propane (EACP), bis(4-amino-3,5-dimethylcyclohexyl)methane (TMACM), 2,2-bis(4-amino-3,5-dimethylcyclo-hexyl)propane (TMACP).

The expression PACM used in this application therefore means the ISO name bis(4-aminocyclohexyl)methane, which is obtainable commercially as 4,4'-diaminodicyclohexylmethane or Dicykan (CAS No. 1761-71-3). The expression MACM means the ISO name bis(4-amino-3-methylcyclohexyl)methane, which is obtainable commercially as 3,3'-dimethyl-4,4'-diaminodicyclohexylmethane or Laromin C260 (CAS No. 6864-37-5).

It is very particularly preferable that the starting material (a2) is a cycloaliphatic diamine selected from the group consisting of: bis(4-amino-3-methylcyclohexyl)methane (MACH), bis(4-aminocyclohexyl)methane (PACM) and mixtures thereof. Exclusive use of MACM is particularly preferred.

As far as the proportions of the diamines are concerned, it is preferable that the proportion of (a1) is in the range 58-75 mol %, preferably in the range 60-72 mol %, particularly preferably in the range 63-72 mol %.

The proportion of (a2) is with preference in the range 25-42 mol %, preferably in the range 28-40 mol %, particularly preferably in the range 28-37 mol %.

The proportions of (a1) and (a2) here are naturally always based on the entirety of the diamines used, and give a total of 100 mol %.

The starting material (a3) is preferably an aromatic dicarboxylic acid having 6-36 carbon atoms. It is preferable that (a3) is selected from the group consisting of: terephthalic acid (TPA), various naphthalenedicarboxylic acids (NDA), in particular 1,5-naphthalenedicarboxylic acid and 2,6-naphthalenedicarboxylic acid, isophthalic acid (IPA), various biphenyldicarboxylic acids, for example diphenic acid (biphenyl-2,2'-dicarboxylic acid), diphenyl-4,4'-dicarboxylic acid, diphenyl-3,3'-dicarboxylic acid, diphenyl ether 4,4'-dicarboxylic acid, diphenylmethane-4,4'-dicarboxylic acid and diphenyl sulphone 4,4'-dicarboxylic acid, anthracene-1,5-dicarboxylic acid, p-terphenylene-4,4"-dicarboxylic acid and pyridine-2,5-dicarboxylic acid and mixtures thereof.

With particular preference, component (a3) is selected from the group consisting of terephthalic acid and isophthalic acid and mixtures thereof.

When a mixture of terephthalic acid and isophthalic acid is used as aromatic dicarboxylic acid of component (a3), these two systems are present within component (a3), terephthalic acid:isophthalic acid, in a molar ratio of preferably 2:1-1:2, in particular in a ratio of 1:1.5. It is very particularly preferable to use an equimolar mixture of terephthalic acid and isophthalic acid.

According to another preferred embodiment, the starting material (a4) is a linear or branched aliphatic dicarboxylic acid having 10-14 carbon atoms or a mixture of such dicarboxylic acids.

It is preferable that (a4) is a linear aliphatic dicarboxylic acid selected from the following group: decanedioic acid, undecanedioic acid, dodecanedioic acid, tridecanedioic acid, tetradecanedioic acid, hexadecanedioic acid and mixtures thereof.

Particular preference is given to exclusive use of dodecanedioic acid as starting material (a4).

As far as the proportions of the dicarboxylic acid are concerned, the proportion of (a3) is with particular preference in the range 40-78 mol % or 50-77 mol %, preferably in the range 60-75 mol %.

The proportion of (a4) is preferably in the range 22-60 mol % or 23-50 mol %, is with preference in the range 25-40 mol %.

The proportions of (a3) and (a4) are always based on the entirety of the dicarboxylic acids used and give a total of 100 mol %.

A particularly preferred polyamide moulding composition with ideal properties is characterized in that for the structure of (A)

(a1) is selected to be 1,6-hexamethylenediamine;

(a2) is selected to be MACM, PACM, or a mixture thereof, preferably to be exclusively MACM;

(a3) is selected to be terephthalic acid, isophthalic acid, or a mixture thereof, preferably a mixture in a ratio of 1.5:1-1:1.5, with particular preference an equimolar mixture;

(a4) is selected to be dodecanedioic acid.

The proportions of the components here are preferably selected as follows: (a1) in the range 60-75 mol %; (a2) in the range 25-40 mol %; (a3) in the range 60-75 mol %; (a4) in the range 25-40 mol %; where the proportions of (a1) and (a2) are based on the entirety of the diamines used and give a total of 100 mol %, and where the proportions of (a3) and (a4) are based on the entirety of the dicarboxylic acids used and give a total of 100 mol %.

A point of general importance here is that in the context of (A) there are no units used that are based on lactam or on amino acids. (A) is therefore in essence free from lactam and amino acid units (i.e. less than 2 percent by weight content, preferably less than one percent by weight, based on the entire composition of (A)), preferably completely free therefrom.

The content of component (A) in the moulding composition is preferably in the range 60 to 99.9% by weight, particularly preferably in the range 80 to 99.5% by weight and with particular preference in the ranges 90.0 to 99.9 and 97.0 to 99.5% by weight.

It is moreover preferable that a solution viscosity ($\eta_{rel}$) of the transparent polyamide (A), determined on solutions of 0.5 g of polymer in 100 ml of m-cresol in accordance with ISO 307:2013-08 at 20° C. is between 1.5 and 1.9, particularly between 1.60 and 1.80 and very particularly preferably between 1.65 and 1.75.

It is preferable that a glass transition temperature of the polyamides (A) is at least 100° C., preferably at least 12.0 or 130° C. and particularly preferably at least 140° C., but at the same time preferably not higher than 220° C. or not higher than 200° C., where the glass transition temperature is determined by means of DSC in accordance with ISO 11357-2:2013-05 with heating rate 20 K/min.

The enthalpies of fusion of the transparent, amorphous polyamides (A) are not measurable or are very small: at most 4 J/g, preferably at most 2 (determined in accordance with ISO 11357-3:2013-04 on pellets, Differential Scanning Calorimetry (DSC) with heating rate 20° C./min).

The polyamide moulding compositions of the invention can comprise additives (component B) in a proportion of 0-50% by weight, preferably 0.1-40% by weight and particularly preferably 0.5-20% by weight, based on the moulding composition, or else in the preferably small proportions of at most 10% by weight, preferably at most 5% by weight, with particular preference at most 3% by weight.

The additives mentioned can be UV stabilizers, heat stabilizers, free-radical scavengers, processing aids, inclusion preventers, lubricants, demoulding aids, inclusive of metal stearates and metal montanates (metal=magnesium, calcium, barium), mineral oils and fatty acid amides, plasticizers, functional additives for influencing optical properties, in particular refractive index, impact modifiers, fillers and/or aggregates, optical brighteners, dyes and mixtures thereof, where the fillers and/or aggregates are preferably nanoscale and/or selected from the following group: glass fibres, glass beads, carbon fibres, carbon black, graphite, flame retardants, mineral inclusive of titanium dioxide, calcium carbonate and barium sulphate. The moulding compositions can therefore comprise (as component (B) nanoscale fillers and/or nanoscale functional materials, e.g. laminar minerals or metal oxides, which increase refractive index, or optical brighteners or dyes, e.g. photochromic dyes.

For the purposes of the invention, the moulding compositions can moreover comprise fillers and/or aggregates that are familiar to the person skilled in the art, for example glass fibres, glass beads, carbon fibres, carbon black, graphite, flame retardants, mineral such as titanium dioxide, calcium carbonate and barium sulphate, or by way of example impact modifiers, for example functionalized polyolefins.

Preferred impact modifiers derive from the group selected from acid-modified ethylene-α-olefin copolymers, ethylene-glycidylmethacrylic acid copolymers and methacrylate-butadiene-styrene copolymers.

Materials that can be used as reinforcing agents are not only glass fibres and carbon fibres but also particularly those based on renewable feedstocks and on biocontents above 50%. It is particularly preferable to use natural fibres, e.g. cellulose fibres, hemp fibres, flax fibres, cotton fibres, wool fibres or wood fibres.

However, the additives of component (B) can also be polymers different from (A), with particular preference polyamides. If polyamides are used as additives of component (B), the material here is preferably an aliphatic polyamide, with particular preference selected from the following list: PA46, PA410, PA56, PA510, PA6, PA66, PA68, PA69, PA610, PA1010, PA106, PA11 and PA12, and also mixtures thereof. However, it is preferable that polymers different from (A) are not present for the purposes of component (B).

Polymer component (A) is preferably produced in pressure vessels known per se. This begins by way of example with a pressure phase at 250° C. to 320° C. This is followed by way of example by depressurization at 250° C. to 320° C. Devolatilization is carried out by way of example at 260° C. to 320° C. The polyamide moulding composition is then discharged in strand form, cooled in a water bath to, for example, 5° C. to 80° C., and pelletized. The pellets are typically dried for 12 hours at 80° C. to a water content that is preferably below 0.06%. During the drying procedure, with simultaneous circulation of the pellets, additives such as lubricants, dyes, stabilizers, or other additives can be applied to the pellets by sintering or other methods.

The polyamides are generally produced by using the diamines and the dicarboxylic acids in a ratio of 1:1, but can also comprise an excess of the diamines or dicarboxylic acids for reasons of molar-mass regulation, but it is preferable here that the ratio is not outside the range 1:1.10 to 1.10:1. It is also possible that monofunctional diamines and carboxylic acids are used for regulation. By way of example in order to establish the desired relative viscosity (component (A)) of preferably 1.40 to 2.40, with preference 1.5 to 1.9 and with particular preference 1.60 to 1.80 in a solution of 0.5 g of polymer in 100 ml of m-cresol at 20° C. It is possible to use a small excess of 0.01 to 2 mol % either of the diamines or of the dicarboxylic acids. It is preferable to achieve the regulation by using monoamine or monocarboxylic acids, inclusive of benzoic acid and stearic acid, at 0.01 to 2.0% by weight, preferably 0.05 to 0.5% by weight, based on the entirety of the monomers a1 to a4. Suitable regulators are benzoic acid, acetic acid, propionic acid, stearylamine and mixtures of these. Particular preference is given to regulators having amine groups or having carboxylic acid groups which also comprise stabilizer groups of the HALS type or of the tert-butylphenol type, for example triacetonediamine or isophthalic acid-ditriacetonediamine derivatives.

Suitable catalysts to accelerate the polycondensation reaction are phosphorus-containing acids, for example $H_3PO_2$, $H_3PO_3$, $H_3PO_4$, salts of these, or organic derivatives, where they simultaneously reduce discoloration during processing. Quantities added of the catalysts are normally in the range 0.001 to 0.5% by weight, preferably in the range 0.005 to 0.1% by weight. Suitable antifoams for avoiding foaming during devolatilization are aqueous emulsions which comprise silicones or silicone derivatives in quantities in the range 0.01 to 1.0% by weight, preferably in the range 0.01 to 0.10 in the case of a 10% emulsion. In particular, it is preferable to avoid the use of silicone-containing antifoams during the production of the polyamides (A) of the invention, and it is very particularly preferable to use no antifoams.

Suitable heat stabilizers or UV stabilizers can be added in quantities of 0.01 to 0.5% by weight to the mixture before the polycondensation. It is preferable to use high-melting-point varieties. It is particularly preferable to use Irganox 1098.

The provision of additives to the transparent moulding compositions of the invention, examples being stabilizers, lubricants such as paraffin oils or stearates, dyes, fillers, impact modifiers such as terpolymers derived from ethylene-glycidyl methacrylate, preferably with refractive index in the range of the moulding compositions of the invention, or maleic-anhydride-grafted polyethylenes, propylenes, or reinforcing materials such as transparently dispersible nanoparticles or glass beads or glass fibres, or a mixture of the additives, can be achieved by known mixing processes, in particular extrusion in single- or multiscrew extruders, using melt temperatures between 250° C. and 350° C.

The present invention therefore moreover provides a process for the production of these polyamide moulding compositions, and the abovementioned object is moreover achieved via the claimed process for the production of these polyamide moulding compositions. It is preferable here that polymer component (A) is produced in pressure vessels, with a pressure phase at 250° C. to 320° C. followed by depressurization at 250° C. to 320° C., followed by devolatilization at 260° C. to 320° C., and also discharge of the polyamide moulding composition in strand form, cooling, pelletization and drying of the pellets, compounding of component (A), and optionally (B), in the form of pellets and moulding in an extruder at melt temperatures of 220° C. to 350° C. to give a strand, and chopping by suitable pelletizers to give pellets.

Suitable processes for the production of high-transparency mouldings made of the transparent polyamide moulding compositions of the invention are injection-moulding processes or injection-compression-moulding processes typically with melt temperatures of 230° C. to 330° C., where the mould is adjusted to temperatures that are preferably 40° C. to 130° C., very preferably 60 to 120° C., and where optionally the mould at temperatures that are preferably 40° C. to 130° C. after filling of the cavity applies compression to the hot moulding. A particularly suitable process for the production of defect-free, low-stress surfaces of the moulding made from the transparent polyamide moulding compositions of the invention, examples being spectacle lenses or high-specification housing components, is an expansion injection-compression-moulding process where cavities with wall thicknesses of 1 to 5 mm are filled and then the mould cavity is enlarged to give greater wall thicknesses while filling continues.

Suitable processes for the production of films, tubes and semifinished products of single- or multilayer design made from the transparent polyamide moulding compositions of the invention are extrusion processes in single- or multi-screw extruders using melt temperatures between 250° C. and 350° C. where suitable adhesion promoters in the form of appropriate copolymers or blends can be used if required by the compatibility of the various layers.

Mouldings composed of the polyamide compositions of the invention can be bonded to one another by conventional processes, for example by ultrasound welding, glow-wire welding, frictional welding, spin welding or laser welding via provision of laser-active dyes with absorption in the range 800 nm to 2000 nm.

Suitable processes for the production of hollow bodies and bottles of single- or multilayer design made of the transparent polyamide moulding compositions of the invention are injection-blow-moulding processes, injection-stretch-blow-moulding processes and extrusion-blow-moulding processes.

The moulding compositions of the invention can also be processed to give films, e.g. flat films, blown films, cast films, multilayer films. Further processing of the films is preferably achieved via lamination, in-mould coating, stretching, orientation, printing or dyeing.

Mouldings can be bulk-dyed or subsequently coloured by using what are known as immersion baths. Mouldings are optionally subjected to milling, drilling, grinding, laser-marking, laser-cutting or laser-welding.

Suitable uses for mouldings composed of the transparent polyamide moulding compositions of the invention are housing elements or display elements or component elements of a machine, of an automobile, of a household device, of a toy, of a sports item or of an in particular portable electrical or electronic device, for example in particular of a mobile phone, computer, laptop, GPS device, MP3 player, camera, optical device or combination thereof, or is a spectacle frame, a spectacle lens or other lens, a binocular, a viewing window for heating systems with direct oil contact, a filter cup for drinking-water treatment, a feeding bottle, carbonization bottle, crockery, flow meter for gases or liquids, clock casing, watch casing, lamp housing or reflector for automobile lamps or element thereof, and also decorative parts and parts of toys.

The present invention moreover therefore relates to the claimed mouldings made of these polyamide moulding compositions, preferably produced by the abovementioned process. In other words, the abovementioned object is moreover achieved via these mouldings obtainable from the polyamide moulding compositions described above, preferably produced by means of injection-moulding processes and/or injection-compression-moulding processes at melt temperatures that are preferably 230° C. to 320° C., where the mould is adjusted to temperatures that are preferably 40° C. to 130° C. and where optionally the mould at temperatures that are preferably 40° C. to 130° C., very preferably 60 to 120° C., after filling of the cavity applies compression to the hot moulding.

The mouldings produced from the unreinforced moulding compositions of the invention exhibit stiffness properties with tensile moduli of elasticity of 1800 to 3500 MPa, preferably with tensile moduli of elasticity of 2000 to 3000 MPa, and particularly preferably with tensile moduli of elasticity of 2100 to 2600 MPa. The test specimens for measuring the Charpy impact values exhibited little or no fracture at room temperature (23° C.) and also preferably at −30° C.

This moulding is preferably characterized by high light transmittance measured in accordance with ASTM D1003, determined on plaques measuring 2×60×60 mm or on discs measuring 2×70 mm, at a temperature of 23° C., with Haze-Gard Plus measurement equipment from the company Byk Gardner using CIE illuminant C, where light transmittance is at least 85%, preferably at least 88% and particularly preferably at least 90%.

It is moreover preferable that this moulding is characterized by low haze measured in accordance with ASTM D1003 of at most 5%, preferably of at most 3% and very particularly preferably of at most 2%, of a plaque of thickness 2 mm produced from the transparent polyamide moulding composition.

This moulding is moreover characterized preferably by a tensile strain at break, measured in accordance with ISO 527-1:20102; 527-2:2012 at a tensile testing velocity of 50 mm/min on an ISO tensile specimen of type A1, 170×20/10×4 mm, at a temperature of 23° C., of at least 100%, preferably at least 120%, particularly preferably at least 130%, preferably with a tensile modulus of elasticity of more than 2000 MPa, preferably of more than 2100 MPa, measured in accordance with ISO 527 with a tensile testing velocity of mm/min on an ISO tensile specimen of type A1, 170×20/10×4 mm, at a temperature of 23° C.

The dependent claims provide further embodiments.

DESCRIPTION OF PREFERRED EMBODIMENTS

Preferred embodiments of the invention are described below with reference to the Inventive Examples, which serve merely for illustration and are not to be interpreted as restrictive.

Production of the Moulding Compositions:

Examples IE1, aIE2 and CE7: The polyamides IE1, a IE2 and CE7 were produced in a stirrable pressure autoclave equipped with a feed vessel and a reaction vessel. The following materials were supplied to the feed vessel:

(a) for Inventive Example IE1: 17.518 kg of bis(4-amino-3-methylcyclohexyl)methane, 14.526 kg of 1,6-hexanediamine, 10.123 kg of terephthalic acid, 10.123 kg of isophthalic acid and 17.209 kg of dodecanedioic acid, 30 kg of deionized water and 11 g of hypophosphorous acid (50% solution), (b) for Inventive Example IE2: 12.871 kg of bis(4-amino-3-methylcyclohexyl)methane, 18.594 kg of 1,6-hexanediamine, 13.090 kg of terephthalic acid, 13.090 kg of isophthalic acid and 12.433 kg of dodecanedioic acid, 30 kg of deionized water and 8 g of hypophosphorous acid (50% solution), (c) for Comparative Example CE7: 23.045 kg of bis(4-aminocyclohexyl)methane, 12.895 kg 1,6-hexanediamine, 29.065 kg isophthalic acid and 10.073 kg dodecanedioic acid, 30 kg deionized water and 8 g hypophosphorous acid (50% solution), and in each case was inertized with nitrogen. The system was heated, with stirring, to 180 to 230° C. under the resultant pressure until a homogeneous solution was produced. This solution was transferred through a sieve into the reaction vessel, where it was heated to a reaction temperature of 270 to 310° C. at a pressure of at most 30 bar and stirred under these conditions for a period of 2 to 4 hours. In the subsequent depressurization phase, the pressure was reduced to atmospheric pressure within a period of 1 to 2 hours, and the temperature was maintained in the range 270 to 300° C. After achievement of a relative viscosity of 1.73 for Inventive Example 1E1, of 1.70 for Inventive Example IE2 and of 1.53 for Comparative Example CE7, the polyamide moulding composition is discharged in strand form, cooled in a water bath and pelletized. The pellets are dried for 12 hours at 80° C. to a water content that is preferably below 0.06%.

The other CE Examples were produced by the same process, using the same total mass of starting material, and also using 30 kg of deionized water, but using the starting-material proportions shown in the Table below. 0.01% by weight (based on the total mass of the starting materials inclusive of water) of hypophosphorous acid (50% solution) was added to the mixtures in order to accelerate the polycondensation.

High-transparency mouldings or test specimens made of the transparent polyamide moulding compositions of the invention were produced in an Arburg 420C Allrounder 1000-250 injection-moulding machine at melt temperatures of 260° C. to 330° C., the mould here being adjusted to a temperature in the range 60 to 120° C. The screw rotation rate was 150 to 400 rpm.

The resultant materials and mouldings have the constitutions and properties listed in Table 1 and Table 2.

TABLE 1

|  |  | IE1 | IE2 | CE1 EP'373 E12 | CE2 EP'373 E11 | CE3 EP'373 E10 | CE4 EP'373 E2 |
|---|---|---|---|---|---|---|---|
| HMDA | mol % | 63.0 | 74.8 | 0 | 0 | 15 | 0 |
| MACM | mol % | 37.0 | 25.2 | 100 | 100 | 85 | 100 |
| PACM | mol % |  |  |  |  |  |  |
| IPA | mol % | 31.0 | 37.2 | 50 | 100 | 90 | 0 |
| TPA | mol % | 31.0 | 37.2 | 50 | 0 | 10 | 0 |
| DDA | mol % | 38.0 | 25.6 | 0 | 0 | 0 | 100 |
| LC12 | % by wt. | 0 | 0 | 24 | 34 | 0 | 0 |
| Tensile modulus of elasticity | MPa | 2200 | 2500 | 2200 | 2300 | 3200 | 1580 |

TABLE 1-continued

|  |  | IE1 | IE2 | CE1 EP'373 E12 | CE2 EP'373 E11 | CE3 EP'373 E10 | CE4 EP'373 E2 |
|---|---|---|---|---|---|---|---|
| Ultimate tensile strength | MPa | 72 | 64 | 61 | 60 | 85 | 60 |
| Tensile strain at break | % | 149 | 132 | 52 | 60 | 16 | 150 |
| Tg | ° C. | 141 | 140 | 192 | 165 | 148 | 153 |
| Transparency | % | >90 | >90 | >90 | >90 | >90 | >90 |
| Haze | % | <2 | <2 | <2 | <2 | <2 | <2 |
| Impact resistance | kJ/m² | nf | nf | nf | nf | 120 | nf |
| Notched impact resistance | kJ/m² | 10 | 11 | 9 | 7 | 5 | 9 |
| ΔYI (6 weeks, 60° C.) | — | 1.6 | 1.9 | 5.0 | nd | nd | 2.7 |
| Ball impact test | — | (+) | (+) | (--) | nd | nd | (++) |

HMDA: 1,6-Hexamethylenediamine; MACM: bis(4-amino-3-methylcyclohexyl)methane;
PACM: bis(4-aminocyclohexyl)methane;
IPA: isophthalic acid;
TPA: terephthalic acid;
DDA: dodecanedioic acid;
LC12: laurolactam;
nf: no fracture;
EP'373: reference to the corresponding example in EP-A-1930373;
nd: not determined.

TABLE 2

|  |  | CE5a EF'930 CE-A | CE5b EP'930 CE-A | CE6 | CE7 EP'130 Ex. 2 |
|---|---|---|---|---|---|
| HMDA | mol % | 95.4 |  | 79.7 | 50 |
| MACM | mol % | 0 |  | 15.1 | 0 |
| PACM | mol % | 4.6 |  | 5.2 | 50 |
| IPA | mol % | 70 |  | 50 | 80 |
| TPA | mol % | 30 |  | 50 | 0 |
| DDA | mol % | 0 |  | 0 | 20 |
| LC12 | % by wt. | 0 |  | 3.4 | 0 |
| CE-A | % by wt. |  | 80 |  | 0 |
| PA66 | % by wt. |  | 20 |  | 0 |
| Tensile modulus of elasticity | MPa | 2780 | 2100 | 2800 | 2580 |
| Ultimate tensile strength | MPa | 68 | 55 | 73 | 65 |
| Tensile strain at break | % | 49 | 75 | 68 | 83 |
| Tg | ° C. | 128 | 106 | 160 | 163 |
| Transparency | % | >90 | 89 | >90 | >90 |
| Haze | % | <2 | 3 | <2 | <2 |
| Impact resistance | kJ/m² | 110 | 100 | nf | nf |
| Notched impact resistance | kJ/m² | 4 | 3 | 10 | 9 |
| ΔYI (6 weeks, 60° C.) |  | nd | nd | 4.2 | nd |
| Ball impact test | — | (—) | nd | (—) | (—) |

HMDA: 1,6-Hexamethylenediamine; MACM: bis(4-amino-3-methylcyclohexyl)methane: PACM: bis(4-aminocyclohexyl)methane; IPA: isophthalic acid; TPA: terephthalic acid; DDA: dodecanedioic acid; LC12: laurolactam; nf: no fracture; EP'930: reference to Comparative Example A (CE-A) in EP-A-885930; PA66: polyamide 66 made of 1,6-hexamethylenediamine and adipic acid; nd: not determined; EP'130: Reference to Example 2 on page 10 in EP-A-0041130.

Methods:

Glass transition temperature ($T_g$) was determined in accordance with ISO 11357-1/2. Differential Scanning Calorimetry (DSC) was carried out with heating rate 20 K/min.

Relative viscosity ($\eta_{rel}$) was measured in accordance with DIN EN ISO 307:2013-08 on the basis of 0.5% by weight m-cresol solutions at 20° C. Pellets are used as specimen. Tensile modulus of elasticity, ultimate tensile strength and tensile strain at break were determined in accordance with ISO 527 at a tensile testing velocity of 1 mm/min (tensile modulus of elasticity) and, respectively, 50 mm/min (ultimate tensile strength, tensile strain at break) on an ISO tensile specimen; standard: ISO/CD 3167, of type A1, 170×20/10×4 mm at temperature 23° C.

Impact resistance and notched impact resistance by the Charpy method were measured in accordance with ISO 179/keU on an ISO test specimen; standard: ISO/CD 3167, of type B1, 80×10×4 min at a temperature of 23° C.

Light transmittance (transparency) and haze were determined in accordance with ASTM D1003 on plaques measuring 2×60×60 mm or on discs measuring 2×70 mm, at a temperature of 23° C., with Haze-Gard Plus measurement equipment from the company Byk Gardner using CIE illuminant C. The light transmittance values are stated in % of the incident light.

Change of Yellow Index During Storage:

The pellets produced as described above were injection-moulded to give plaques measuring 60×60×2 min immediately after drying (specimens prior to storage). Yellow Index in accordance with ASTM D1925 was determined on these plaques. To this end, in each case 5 plaques were tested, and the arithmetic average value was calculated. This Yellow Index determined from pellets prior to storage was used as initial value. Alongside this, pellets from drying were packed in bags and stored in a drying oven at 60° C. for 6 weeks. The material was stored in bags measuring 35×53.5 cm made of a PET/aluminium/PE laminate with layer thicknesses of 12/9/100 μm, laminated with use of 2-component adhesive without use of solvent (supplier: Vacopack H. Buchegger A G, Switzerland). 2 kg of the polyamide pellets were weighed into the bag. The residual air above the material in the bag was forced out of the bag, and the bag was welded so as to be airtight directly above the fill boundary. After storage, the bags were cooled to 23° C. and opened, the polyamide pellets were injection-moulded to give plaques measuring 60×60×2 mm, and the Yellow Index (ASTM D1925) of these plaques was measured (final value; arithmetic average of measurements on 5 plaques). The tables show the Yellow Index difference (ΔYI) calculated from the Yellow Index of the plaques made of pellets prior to storage (initial value) and of pellets stored for 6 weeks (final value).

Ball impact test: Ductility was evaluated by carrying out a ballistic ball impact test, alongside the tensile test. The test was carried out on plaques measuring 60×60×2 mm, with a ULT™-(II) device from SKILARK Machine Inc. For this, the plaques were subjected to the impact of a steel ball at an angle of 90° from a distance of 580±5 mm. The steel ball, weighing 1 g and with diameter 6.3 mm, was projected by a pressure of 2 bar perpendicularly onto the centre of the plaque. The test was carried out on 5 plaques, and after the test the plaques were assessed against the following criteria: no cracks, no fracture (++); cracks, no fracture (+); no fracture, large cracks (−); brittle fracture, splintering (−−).

Results:

Mouldings made of the polymer mixtures of the invention have good mechanical and thermal properties. The mouldings of the invention exhibit good transparency (transmittance) and haze.

As in particular the Comparative Examples CE3 and CE7 show, although the materials according to the prior art of the general type MACMI/6T and PACMI/612 are able to provide good values for the tensile modulus of elasticity, and good ultimate tensile strength, they are not able to provide good tensile strain at break and simultaneously low susceptibility to fracture in the ball impact test. If the proportion of cycloaliphatic diamine is 50% or above, based on the diamine fraction, susceptibility to fracture becomes excessive and fracture is no longer ductile, but instead is brittle. Although, on the other hand (cf. CE4), exclusive use of MACM12 provides good tensile strain at break and low susceptibility to fracture in the ball impact test, modulus of elasticity is inadequate. If lactam units are used (cf. CE2 and CE3, and also CE6), although good values are achieved for tensile modulus of elasticity, and also for ultimate tensile strength, results for tensile strain at break and for susceptibility to fracture in the ball impact test in contrast remain poor. If component (a4) is omitted, in which connection cf. CE5a, the same result is observed: tensile strain at break and susceptibility to fracture remain unsatisfactory. Although addition of an impact modifier (polyamide 66 here), cf. in this connection CE5b, can increase tensile strain at break to some extent, ultimate tensile strength and tensile modulus of elasticity are then immediately reduced and, especially, optical values (transparency and haze) then also become poor.

The invention claimed is:

1. A polyamide moulding composition consisting of the following constituents:
   (A) 50 to 100% by weight of at least one transparent polyamide composed of:
      (a1) 60 to 77 mol % of a linear aliphatic diamine having 6 to 10 carbon atoms;
      (a2) 23 to 33 mol % of exclusively bis(4-amino-3-methylcyclohexyl)methane (MACM),
         where the proportions of (a1) and (a2) are based on an entirety of the diamines used and give a total of 100 mol %;
      (a3) 40 to 80 mol % of a mixture of terephthalic acid and isophthalic acid in a molar ratio of 1.5:1-1:1.5; and
      (a4) 20 to 60 mol % of an acyclic, linear aliphatic dicarboxylic acid selected from the group consisting of decanedioic acid, undecanedioic acid, dodecanedioic acid, and mixtures thereof;
         where the proportions of (a3) and (a4) are based on an entirety of the dicarboxylic acids used and give a total of 100 mol %; and
   (B) 0 to 50% by weight of additives;
   wherein an entirety of components (A) and (B) gives 100% by weight.

2. The polyamide moulding composition according to claim 1, wherein
   the proportion of (a3) is in the range 40-78 mol %, and/or
   wherein the proportion of (a4) is in the range 22-60 mol %,
      where the proportions of (a3) and (a4) are based on the entirety of the dicarboxylic acids used and give a total of 100 mol %.

3. The polyamide moulding composition according to claim 1,
   wherein the proportion of component (A) is in the range 60 to 99.9% by weight, based on the moulding composition made of (A) and (B), and/or
   wherein the proportion of component (B) is in the range 0-50% by weight, based on the moulding composition made of (A) and (B).

4. The polyamide moulding composition according to claim 1, wherein
   (a1) is selected to be 1,6-hexamethylenediamine; and
   (a4) is selected to be dodecanedioic acid.

5. The polyamide moulding composition according to claim 1, wherein the additives of component (B) are selected from the group consisting of: polyamides different from (A); UV stabilizers; heat stabilizers; free-radical scavengers, processing aids; inclusion preventers; lubricants; demoulding aids, inclusive of metal stearates and metal montanates, mineral oils and fatty acid amides; plasticizers; functional additives for influencing optical properties; impact modifiers; fillers and/or aggregates; optical brighteners; dyes and mixtures thereof.

6. A process for the production of a polyamide moulding composition according to claim 1, wherein the production of polymer component (A) takes place in pressure vessels, with a pressure phase at 270° C. to 330° C. followed by depressurization at 260° C. to 320° C., followed by devolatilization at 260° C. to 320° C., and also discharge of the polyamide moulding composition in strand form, cooling, pelletization and drying of the pellets, compounding of component (A), and if present (B), in the form of pellets and moulding in an extruder at melt temperatures of 250° C. to 350° C. to give a strand, and chopping by suitable pelletizers to give pellets.

7. A moulding, obtained from a polyamide moulding composition according to claim 1 by means of injection-moulding processes and/or injection-compression-moulding processes at melt temperatures of 230° C. to 320° C., where the mould is adjusted to temperatures of 40° C. to 130° C. and where optionally the mould at temperatures of 40° C. to 130° C. after filling of the cavity applies compression to the hot moulding.

8. The moulding according to claim 7,
   wherein the moulding has a light transmittance, measured in accordance with ASTM D1003, determined on plaques measuring 2×60×60 mm or on discs measuring 2×70 mm, at a temperature of 23° C., with haze-gard plus measurement equipment from the company Byk Gardner using CIE illuminant C, of at least 85%, and/or characterized by haze measured in accordance with ASTM D1003 of at most 5%, of a plaque of thickness 2 mm produced from the transparent polyamide moulding composition.

9. The moulding according to claim 7, wherein the moulding has a tensile strain at break of at least 100%, measured in accordance with ISO 527 at a tensile testing velocity of 50 mm/min on an ISO tensile specimen of type A1, 170×20/10×4 mm, at a temperature of 23° C., and/or a tensile modulus of elasticity of more than 2000 MPa measured in accordance with ISO 527 with a tensile testing velocity of 1 mm/min on an ISO tensile specimen of type A1, 170×20/10×4 mm, at a temperature of 23° C.

10. The moulding according claim 7, wherein said moulding is a housing element or display element or a component element of a machine, of an automobile, of a household device, of a toy, of a sports item or of an electrical or electronic device or is a spectacle frame, a spectacle lens or other lens, a binocular, a viewing window for heating systems with direct oil contact, a filter cup for drinking-water treatment, a feeding bottle, carbonization bottle, crockery, flow meter for gases or liquids, clock casing, watch casing, lamp housing or reflector for automobile lamps or element thereof.

11. The polyamide moulding composition according to claim 1, wherein the starting material (a1) is a linear diamine having 6-8 carbon atoms.

12. The polyamide moulding composition according to claim 1, wherein the starting material (a1) is at least one of 1,6-hexamethylenediamine and 2-methyl-1,5-pentanediamine.

13. The polyamide moulding composition according to claim 1,
wherein the proportion of (a1) is in the range 60-72 mol %, and/or
wherein the proportion of (a2) is in the range 28-40 mol %,
where the proportions of (a1) and (a2) are based on the entirety of the diamines used and give a total of 100 mol %, and/or
wherein the proportion of (a3) is in the range 60-75 mol %, and/or
wherein the proportion of (a4) is in the range 25-40 mol %,
where the proportions of (a3) and (a4) are based on the entirety of the dicarboxylic acids used and give a total of 100 mol %.

14. The polyamide moulding composition according to claim 1, wherein the starting material (a3) is an equimolar mixture of terephthalic acid and isophthalic acid.

15. The polyamide moulding composition according to claim 1, wherein the starting material (a4) is exclusively dodecanedioic acid.

16. The polyamide moulding composition according to claim 1, wherein the proportion of component (A) is in the range 97.0 to 99.5% by weight, based in each case on the moulding composition made of (A) and (B), and/or
wherein the proportion of component (B) is in the range 0.5-20% by weight, based in each case on the moulding composition made of (A) and (B).

17. The polyamide moulding composition according to claim 1, wherein component (B) is present in proportions of at most 3% by weight, based on the moulding composition made of (A) and (B).

18. The polyamide moulding composition according to claim 1, wherein
(a1) is selected to be 1,6-hexamethylenediamine;
(a2) is exclusively MACM;
(a3) is selected to be a mixture of terephthalic acid and isophthalic acid in a ratio of 1.5:1-1:1.5; and
(a4) is selected to be dodecanedioic acid.

19. The polyamide moulding composition according to claim 1, wherein
(a1) is selected to be 1,6-hexamethylenediamine;
(a2) is exclusively MACM;
(a3) is selected to be a mixture of terephthalic acid and isophthalic acid in a ratio of 1.5:1-1:1.5; and
(a4) is selected to be dodecanedioic acid,
where the proportions of the components are selected as follows: (a1) in the range 60-75 mol %; (a2) in the range 25-40 mol %; (a3) in the range 60-75 mol %; (a4) in the range 25-40 mol %; and
where the proportions of (a1) and (a2) are based on the entirety of the diamines used and give a total of 100 mol %, and where the proportions of (a3) and (a4) are based on the entirety of the dicarboxylic acids used and give a total of 100 mol %.

20. The polyamide moulding composition according to claim 1, wherein the additives of component (B) are selected from the group consisting of: polyamides different from (A); UV stabilizers; heat stabilizers; free-radical scavengers, processing aids; inclusion preventers; lubricants; demoulding aids, inclusive of metal stearates and metal montanates, where the metal is selected from the group consisting of magnesium, calcium, barium, mineral oils and fatty acid amides; plasticizers; functional additives for influencing optical properties including refractive index; impact modifiers; fillers and/or aggregates; optical brighteners; dyes and mixtures thereof, where the fillers and/or aggregates are nanoscale and/or selected from the following group: glass fibres, glass beads, carbon fibres, carbon black, graphite, flame retardants, mineral inclusive of titanium dioxide, calcium carbonate and barium sulphate.

21. The moulding according to claim 7,
having a light transmittance, measured in accordance with ASTM D1003, determined on plaques measuring 2×60×60 mm or on discs measuring 2×70 mm, at a temperature of 23° C., with haze-gard plus measurement equipment from the company Byk Gardner using CIE illuminant C, of at least 90%, and/or
having a haze measured in accordance with ASTM D1003 of at most 2%, of a plaque of thickness 2 mm produced from the transparent polyamide moulding composition.

22. The moulding according to claim 7, wherein the moulding has a tensile strain at break of at least 130%, measured in accordance with ISO 527 at a tensile testing velocity of 50 mm/min on an ISO tensile specimen of type A1, 170×20/10×4 mm, at a temperature of 23° C., and/or a tensile modulus of elasticity of more than 2100 MPa, measured in accordance with ISO 527 with a tensile testing velocity of 1 mm/min on an ISO tensile specimen of type A1, 170×20/10×4 mm, at a temperature of 23° C.

23. The moulding according to claim 7, wherein the moulding is a housing element or display element or a component element of a machine, of an automobile, of a household device, of a toy, of a sports item or of a portable electrical or electronic device, including a mobile phone, computer, laptop, GPS device, MP3 player, camera, optical device or combination thereof, or is a spectacle frame, a spectacle lens or other lens, a binocular, a viewing window for heating systems with direct oil contact, a filter cup for drinking-water treatment, a feeding bottle, carbonization bottle, crockery, flow meter for gases or liquids, clock casing, watch casing, lamp housing or reflector for automobile lamps or element thereof.

24. A polyamide moulding composition consisting of the following constituents:
(A) 50 to 100% by weight of at least one transparent polyamide composed of:
(a1) 60 to 77 mol % of 1,6-hexamethylenediamine;
(a2) 23 to 33 mol % of exclusively bis(4-amino-3-methylcyclohexyl)methane (MACM), where the proportions of (a1) and (a2) are based on an entirety of the diamines used and give a total of 100 mol %;

(a3) 40 to 80 mol % of a mixture of terephthalic acid and isophthalic acid in a molar ratio of 1.5:1-1:1.5; and (a4) 20 to 60 mol % of exclusively dodecanedioic acid; where the proportions of (a3) and (a4) are based on the entirety of the dicarboxylic acids used and give a total of 100 mol %; and (B) 0 to 3% by weight of additives;

wherein an entirety of components (A) and (B) gives 100% by weight.

25. A polyamide moulding composition consisting of the following constituents:

(A) 50 to 100% by weight of at least one transparent polyamide composed of:

(a1) 63 to 75 mol % of 1,6-hexamethylenediamine;

(a2) 25 to 33 mol % of exclusively bis(4-amino-3-methylcyclohexyl)methane (MACM),
where the proportions of (a1) and (a2) are based on an entirety of the diamines used and give a total of 100 mol %;

(a3) 60 to 75 mol % of a mixture of terephthalic acid and isophthalic acid in an equimolar ratio; and (a4) 25 to 40 mol % of exclusively dodecanedioic acid; where the proportions of (a3) and (a4) are based on the entirety of the dicarboxylic acids used and give a total of 100 mol %; and (B) 0 to 3% by weight of additives;

wherein an entirety of components (A) and (B) gives 100% by weight.

* * * * *